United States Patent [19]

Hayden

[11] Patent Number: 4,887,884
[45] Date of Patent: Dec. 19, 1989

[54] CAPILLARY NON-LINEAR OPTICAL WAVEGUIDE DEVICE

[75] Inventor: L. M. Hayden, Lakeland, Minn.

[73] Assignee: Unisys Corporation, Blue Bell, Pa.

[21] Appl. No.: 314,022

[22] Filed: Feb. 23, 1989

[51] Int. Cl.$^4$ .................. G02B 6/02; G01B 9/02; H03F 7/04; F21V 9/14
[52] U.S. Cl. .................. 350/96.29; 350/96.13; 350/96.14; 350/96.30; 350/96.32; 350/96.34; 350/355; 350/356; 350/374; 356/345; 307/424; 307/425; 307/430; 252/585
[58] Field of Search ............... 350/96.13, 96.14, 96.15, 350/96.29, 96.30, 96.32, 353, 355, 356, 374; 356/345; 307/424, 425, 426, 430; 252/582, 583, 585, 589

[56] References Cited

U.S. PATENT DOCUMENTS

| | | | |
|---|---|---|---|
| 3,770,350 | 11/1973 | Stone et al. | 350/96.32 X |
| 3,935,472 | 1/1976 | Bethea et al. | 350/96.32 X |
| 4,077,699 | 3/1978 | Dyott et al. | 350/96.34 |
| 4,121,167 | 10/1978 | Gibbs et al. | 307/425 X |
| 4,222,011 | 9/1980 | Kurnit | 307/426 X |
| 4,515,429 | 5/1985 | Smith et al. | 350/96.13 |
| 4,721,352 | 1/1988 | Sorin et al. | 350/96.15 |
| 4,759,820 | 7/1988 | Calvert et al. | 307/425 X |
| 4,766,171 | 8/1988 | De Martino | 307/425 X |
| 4,767,169 | 8/1988 | Teng et al. | 350/96.14 |
| 4,818,616 | 4/1989 | Milverton et al. | 350/96.34 X |

FOREIGN PATENT DOCUMENTS

62-249123 10/1987 Japan ............ 350/96.29 X

OTHER PUBLICATIONS

Bergot et al., "Generation of Permanent Optically Induced..." Optics Lett. vol. 13, No. 7, 7/88 pp. 592-594.
"Nonlinear Optical Interactions in Devices with Cylindrical Geometry", R. Kashyap, Spie V. 682, pp. 170-176 (1986).
"Poled Electro-Optic Waveguide Formation in Thin--Film Organic Media", J. I. Thackara et al., Appl. Phys. Lett—52(13), 3-28-88 pp. 1031-1033.
"Corona-Onset Poling of Nonlinear Molecularly Doped Films", A. Knoesen et al., Opt. Soc. of America, Aug. 22-25, 1988.

Primary Examiner—William L. Sikes
Assistant Examiner—Brian M. Healy
Attorney, Agent, or Firm—Arnold L. Albin; Albert B. Cooper; Glenn W. Bowen

[57] ABSTRACT

An optical waveguide for transmitting light energy is defined by a glass capillary with a core of noncentrosymmetric non-linear optical polymer which has been poled to induce a stable axial alignment of molecules therein. Changes in refractive index of the polymer are induced by an applied electric field. In a preferred embodiment, the waveguide is used as an electric field sensor and may form an arm of a Mach-Zender interferometer. The device is adapted to modulate waveguided electromagnetic energy by a change in refractive index proportional to the applied electric field. In a further embodiment, the birefringent properties of the polymer are used to cause polarized light energy transmitted by the waveguide to undergo a change in polarization, which, when intercepted by a polarization sensitive analyzer, provides an amplitude modulation of the transmitted light energy.

9 Claims, 1 Drawing Sheet

CAPILLARY NON-LINEAR OPTICAL WAVEGUIDE DEVICE

BACKGROUND OF THE INVENTION

1. Field of the Invention

The invention relates generally to electro-optic waveguides and, more specifically, to fiber optic waveguides utilizing a core or surface layer of non-linear optical (NLO) polymer which has been poled to induce a permanent molecular orientation.

2. Description of the Prior Art

Planar electro-optical (E-O) devices in which an applied voltage induces a change in refractive index substantially proportional to the applied voltage are well known in the art. See, for example, U.S. Pat. No. 4,767,169, "Thin Film Waveguide Electro-Optic Modulator". Such devices can be constructed to form waveguides, switches, or modulators, for example, and may utilize interference effects, directional coupling, or rotation of the plane of optical polarization. Extensive background studies may be found in "Nonlinear Optical Properties of Organic and Polymeric Materials", D. J. Williams, Ed., ACS Symposium Series 233, Washington, D.C. (1983), which is hereby incorporated by reference.

While electro-optical devices utilizing bulk-grown inorganic crystals as the propagating medium are well known and widely utilized, they are difficult to grow and process and are limited in bandwidth response. Planar E-O waveguides have also been constructed using certain organic and polymeric materials which exhibit substantial non-linear responses when poled, and provide high damage-free thresholds against the operative electric fields and applied laser beams. However, after formation, the delicate polymer films are subject to mishandling and mechanical damage. In addition, the high-intensity electric fields necessary to polarize the medium (e.g., field strengths in excess of 100,000 V/cm) can induce structural damage to the polymer.

The present invention provides for encapsulating the polymer in an optically transparent hollow fiber to provide physical protection during poling and subsequent handling without impairing the desired optical properties.

SUMMARY OF THE INVENTION

An electro-optic waveguide of the present invention comprises an optically transparent capillary having first and second ends and a substantially centrally disposed bore, and characterized by a first refractive index. An organic thermosetting medium having an intrinsic centrosymmetric molecular organization is disposed within the capillary and poled to exhibit noncentrosymmetric and non-linear optical response and provide a second refractive index greater than the first refractive index of the capillary. The first and second ends of the capillary are respectively coupled to an optical input device and an optical output device. An electric field applied to the capillary will vary the second refractive index proportional thereto thereby coupling at least a portion of electromagnetic radiation applied to the input for transmittal to the output.

DESCRIPTION OF THE PREFERRED EMBODIMENT

An organic polymeric film will exhibit second order non-linear optical properties in accordance with the well-known Pockels effect if the film is doped with noncentrosymmetric molecules and is organized to retain its noncentrosymmetric properties during fabrication of the waveguide. The processes generally used for applying organic polymer film for electro-optic applications, such as spin coating or dip coating, do not provide a noncentrosymmetric film since the bulk structure is still centrosymmetric. Electrically induced poling by applying a high-intensity direct current field is known by those skilled in the art to provide a stable molecular alignment which imparts E-O properties to the polymer substance.

One method for poling has required the deposition of a buffer layer and electrodes upon each side of a doped polymer film linearly disposed upon a bulk substrate (c.f. "Poled Electro-Optic Waveguide Formation in Thin-Film Organic Media", J.I. Thackara, et al, Appl. Phys. Lett. 52 (13), Mar. 28, 1988, pp. 1031–1033). However, breakdown of the film may occur at the high voltages needed for poling and additional buffer layers are needed to protect the polymer during the deposition process.

Another approach, which eliminates the deposition of electrodes on the polymer film, is corona discharge (c.f. "CoronaOnset Polling of Non-Linear Molecularly Doped Films," A. Knoesen, et al, Optical Society of America, Topical Meeting on Nonlinear Optical Properties of Materials, August 1988, Troy, New York). In the corona discharge process, the film is deposited upon a glass substrate which in turn is placed upon a grounded aluminum planar electrode. A point electrode or thin wire electrode is then positioned parallel to and above the film, and the substrate heated to the glass transition temperature of the polymer. A high DC potential of the order of +6.0 KV at 1 $\mu$A is then applied for a predetermined time period, after which the substrate is allowed to cool under the influence of the corona field. When cooled, the field is removed, and the polymer film retains its E-0 properties for an extended period of time.

Figure 1:
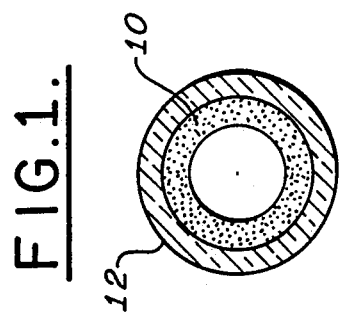
FIG. 1 is a greatly enlarged cross-sectional view of an embodiment of the invention.

The present invention provides for encapsulating the polymer film in a fiber-optic capillary before poling, in order to provide physical protection during the corona discharge and later handling. A glass fiber capillary is formed in a known manner such as by drawing a glass tube down to yield a desired bore diameter. FIG. 1 is a view in cross-section comprising a polymer core 10 and an optical fiber cladding glass 12 of different refractive index. The glass fiber 12 shown in FIG. 1 has a circular cross-section, but other cross-sectional shapes may also be utilized, such as elliptical or rectangular. Suitable capillaries have been fabricated with bores of 10, 50 and 100 $\mu$m and a length of 10 to 15 cm, and comprised of fused silica with a refractive index of 1.46 at a wavelength of −589nm. Conventional fibers used in fiber optics have a small diameter, it being understood that for capillary applications the fiber 12 can be made of any glass or thermosetting plastic material having a suitable refractive index and can be of any suitable length and inner or outer diameters, the material, length, and diameters being dependent on the intended use of the capillary fiber. The capillaries may be drawn down to their relatively small diameter from a larger fiber in much the same way as optical fibers are drawn down from a larger solid preform. Any material with an appropriate refractive index and which can act as a cladding for the light guide while providing protection from the corona field is suitable for use as the capillary.

The polymer core 10 is comprised of any polymer of good optical transmission quality and can be mixed with, in the case of guest/host systems, or attached to, in the case of side-chain systems, an optically non-linear molecule. The optically non-linear molecule is not critical, it being essential, however, that the polymer mixture have a greater refractive index than the capillary cladding. Numerous polymers and NLO molecules are available that will allow construction of the device. One suitable material for the host polymer is poly (methyl methacrylate) (PMMA) while two azo dyes, Disperse Orange #3 and Disperse RED #1, have been used as the NLO guest substance. These materials are available as catalog numbers 18,223-0, 21,571-6, and 21,574-0, respectively, from Aldrich Chemical Company, Inc., Milwaukee, Wis. 53233. The mixture typically provides a refractive index of the order of 1.49 at a wavelength of 589nm.

The capillary is coated with the polymer mixture and poled by the following process. Both the dye and polymer are supplied in powder form and are soluble in hydrocarbons. The dye, which is furnished in a purity of about 30%, is dissolved in acetone and filtered to remove impurities. This process is repeated until substantially all the impurities have been separated out. The process is then repeated with chloroform as a solvent and the solution filtered through a 0.2 $\mu$m filter and evaporated to provide a pure dye powder. The host polymer is also dissolved in a suitable solvent, such as chloroform or chlorobenzine in a ratio of 10% polymer by weight and then filtered. The same solvent is used to dissolve the dye powder. The two solutions are then mixed together and thoroughly agitated with a mechanical stirrer to provide a uniform solution. After mixing, the solution is again filtered to remove dust particles.

Filling of the capillary tubes is done by inserting a tube in the solution. The height to which this solution fills the tube by capillary action is a function of the tube dimensions and the viscosity of the polymer solution. Small diameter capillaries will be completely filled, while larger diameter capillaries may remain with only a film coating the bore after excess solution has run out. The solvent is then allowed to evaporate, which may take up to a few hours.

After the polymer has solidified, it is subjected to a heat treatment and poling. The polymer is heated near or above its glass transition temperature, 80° C. for PMMA, for about 5 min; then a DC electric field of the order of 0.1 to $1 \times 10^6$ v/cm is applied, preferably by the corona discharge method, to align the molecular dipoles of the guest dye in a uniaxial direction. The capillary is then cooled for about 5 min while still immersed in the applied DC electric field. This provides a stable and substantially permanent molecular disposition within the host polymer.

Depending on the intended application, electrodes may be deposited by any conventional process which does not expose the polymer to temperatures approaching its glass transition point. The ends may be sealed and polished for mating to input and output coupling devices, such as prisms or diffraction gratings.

Figure 2:
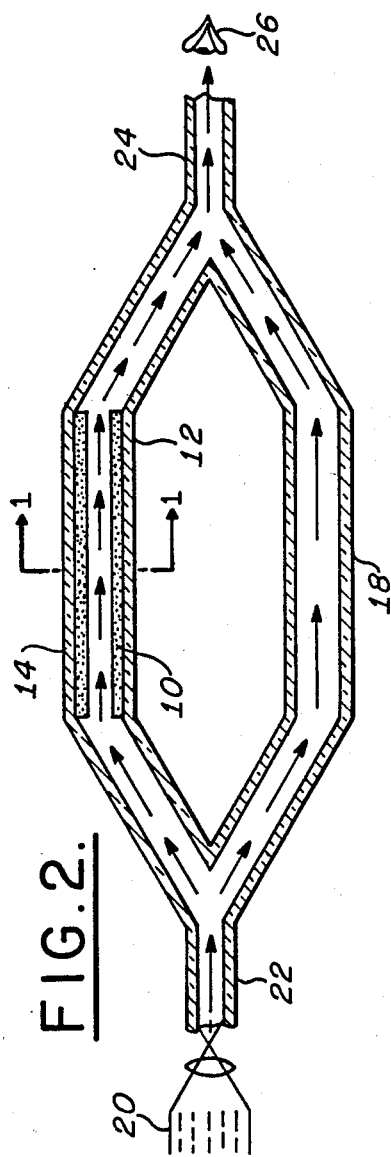
FIG. 2 is a schematic representation of a preferred interferometer assembly embodying the present invention.

In operation, the present invention is primarily useful as an E-field sensor or E-O modulator, although it may readily be adapted to other applications. FIG. 2 shows a Mach-Zender interferometer wherein a capillary waveguide 14 forms one leg, and an optical waveguide 18 of the same index of refraction forms a second leg. A single mode light source 20, such as a laser beam, produces a light beam which is coupled into an optical waveguide 22 and split into equal beams in the two legs 14 and 18. The beams are then recombined into a single beam in a further optical waveguide 24 and the output is coupled to a detector 26. When an incident electric field is applied to the capillary leg 14, it creates a change in the index of refraction, resulting in a phase shift of the light beam in that leg as compared to a reference light beam in leg 18. This shift in phase will cause the combined beams to be modulated according as the two beams add or cancel. If the two arms are identical, in the absence of a field, the signals in each arm will combine to produce a maximum light level. If a field which alters the phase velocity in leg 14 by $\pi$ radians is applied, the signals will destructively interfere to produce a null output. If desired, electrodes may be deposited on the capillary to couple electric fields from a remote source.

Figure 3:
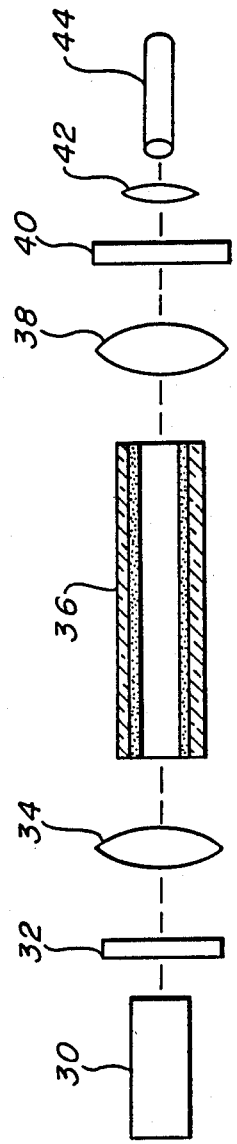
FIG. 3 is a schematic representation of a preferred waveguide electro-optic modulator assembly embodying the present invention.

The capillary waveguide may also be used as a polarization type modulator, as shown in FIG. 3. A source of linearly polarized light energy is coupled into the capillary waveguide so that both TE and TM modes are excited with equal intensity. Since the polymer is birefringent, the degree of birefringence and hence the rotation of the plane of polarization can be controlled via the electric fields applied to the capillary. The electric field causes a phase shift between the TE and TM modes of the light energy coupled to the waveguide. The NLO polymer is capable of a phase shift of $\pi$ radian, which corresponds to a 90° rotation of the input beam polarization, hence when the output is coupled to an analyzer-polarizer, the device may function as a modulator or optical switch.

FIG. 3 illustrates a preferred modulator assembly including a capillary waveguide of the present invention. A suitable source of light energy 30 may comprise a laser, for example. If the light emitted by the laser 30 is not polarized, a suitable polarizer 32 may be employed to polarize the laser energy emitted from the laser assembly 30. A lens 34 may be employed to direct the laser beam to the capillary waveguide 36 of the present invention. The lens 34 may be of a coventional type or a commercially available graded refractive index rod if it is desired to match the geometry of the device. The modulator operates to optically modulate light energy passing therethrough in response to an electrical field, as previously described in connection with FIG. 2. Such modulation is of a phase or polarization character and the modulated light energy passes through a lens 38 and then to an analyzer-polarizer filter 40 which operates to pass selectively only light energy of a predetermined polarization. Accordingly, the changes in polarization effected by the capillary waveguide 36 are converted to proportional changes in the amplitude of light energy upon passing through the analyzer-polarizer filter 40. The modulated light energy then passes through a lens 42 whereupon it may be further transmitted along an optical path 44 which may comprise a fiber optic transmission line, or to a detector.

Figure 4:
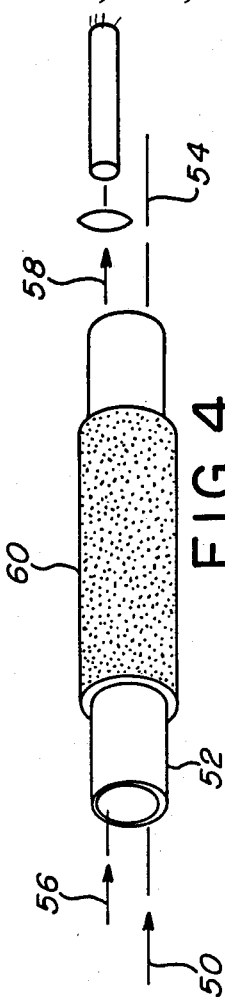
FIG. 4 is a schematic representation of a further preferred waveguide electro-optic modulator assembly employing a pump beam modulator.

FIG. 4 shows a further embodiment which relies on the third order susceptibility of an NLO polymer in a parametric amplifier configuration. A pump beam 50 from a laser light source applies optical energy of the order of 10 mW at 800nm to an optical fiber 52. The output component 54 of the pump beam is transmitted to an absorber (not shown). A weak optical signal 56 which may be at a wavelength of 1600nm is also coupled to the fiber 52 and appears at the output 58. Any suitable means for coupling the input and output signals, such as a wavelength selective directional coupler, may be utilized. Fiber 52 is coated with a film of NLO polymer 60 which has been poled as recited above for the capillary waveguide. The refractive indices and dimensions of the waveguide are chosen so that the optical signal guided wave is near its cutoff frequency. The pump beam 50 interacts with the NLO polymer 60 via the third order NLO susceptibility to produce a change in index of refraction of the polymer that is proportional to the intensity of the pump beam. Such a change can also be realized from an applied electric field. This resultant change in the index of refraction of the waveguide affects the guided mode structure of the signal beam so that modulation of the NLO polymer cladding index by the optical signal results in a corresponding transmitted intensity modulation of the signal beam 54. Effective gains of the order of 40dB have been achieved with non-linear polymers using an organic crystal cored capillary fiber and a fiber length of 10mm.

The term "optically transparent" as employed herein is defined as an optical medium which is transparent or light transmitting with respect to incidental light frequencies and exiting light frequencies.

The term "poling" as employed herein refers to the application of an electric field which is applied to a host medium at the glass-temperature transition state to induce stable uniaxial molecular orientation when the host medium is cooled and solidified.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An electro-optic waveguide device, comprising:
   an optically transparent capillary having first and second ends, a substantially centrally disposed bore, and a first refractive index,
   an organic thermosetting medium having an intrinsic centrosymmetric molecular organization, disposed within said capillary, and having an additive substance poled by exposure to an electric field while in a fluid state to exhibit non-linear optical response and to provide a second refractive index greater than said first refractive index after removal from the influence of said electric field and said medium has solidified,
   means for applying a further electric field to said capillary, thereby to vary said second refractive index in accordance with a predetermined second order susceptibility and the magnitude of said further electric field,
   optical input means for coupling electromagnetic radiation to one of said first or second ends, and
   optical output means for coupling at least a portion of said electromagnetic radiation from one other than said one of said first or second ends.

2. An electro-optic waveguide device as set forth in claim 1, wherein said organic medium comprises a host polymer and an organic dye guest component which exhibits a non-linear optical response when poled, said host and said guest components forming a mixture when poled having a non-centrosymmetric molecular structure.

3. An electro-optic waveguide device as set forth in claim 2, wherein said polymer mixture has a substantially permanent electric field induced molecular alignment.

4. An electro-optic waveguide device as set forth in claim 3, wherein said host is comprised of PMMA and said guest component is comprised of an azo dye.

5. An electro-optic waveguide device as set forth in claim 4, wherein said azo dye is comprised of the group consisting of Disperse Red #1 and Disperse Orange #3.

6. An electro-optic waveguide device as set forth in claim 1, further comprising:
   a source of polarized light energy disposed for transmission by said organic medium, and
   a polarization responsive analyzer positioned to intercept the light energy transmitted by said organic medium.

7. An electro-optic waveguide device as set forth in claim 6, wherein said source of polarized light energy comprises a source of coherent light and polarizer means.

8. An electro-optic waveguide device as set forth in claim 1, further comprising:
   a source of coherent light energy,
   first waveguide means coupled to receive said light energy and divide said light energy into first and second equal amplitude portions,
   said electro-optic waveguide device being coupled to receive said first portion and having a predetermined index of refraction in the absence of said electric field,
   second waveguide means having an index of refraction equal to said predetermined index of refraction and independent of the applied electric field, and coupled to receive said second portion of light energy, and
   waveguide combining means responsive to said light energy portion transmitted through said electro-optic waveguide device and said second waveguide means, for combining said first and second portions in phase relationship to produce a maximum light output in the absence of said further electric field and a null output at a predetermined field intensity of said further electric field.

9. An electro-optic waveguide device comprising:
   an optical fiber having an input and an output,
   an optical signal applied to said input for transmission through said fiber at a first predetermined frequency,
   a source of coherent light energy applied to said input for transmission through said fiber at a second predetermined frequency,
   a cladding layer of an organic polymer disposed on the periphery of said optical fiber and molecularly organized to exhibit third order non-linear optical susceptibility, said optical fiber and said cladding layer having first and second refractive indices and a length and diameter so constructed and arranged as to operate at substantially a predetermined cut-off frequency of said waveguide with respect to the frequency of said optical signal, means for absorbing transmitted coherent light energy at said output, detector means responsive to said optical signal at said output, and means for selectively coupling said optical signal and said source of coherent light energy so that modulation of said second order refractive index by said optical signal results in a corresponding exchange of energy between said optical signal and said source of coherent light energy and a corresonding signal at said output having an amplitude exceeding said optical signal applied at said input.

* * * * *